US012350698B2

(12) United States Patent
Ribeiro da Rocha

(10) Patent No.: US 12,350,698 B2
(45) Date of Patent: Jul. 8, 2025

(54) INDUCTION DEVICE FOR ELECTROSTATIC SPRAY NOZZLE ASSEMBLY

(71) Applicants: Spraying Systems Co., Wheaton, IL (US); Embrapa, Brasilia (BR)

(72) Inventor: Edson Francelino Ribeiro da Rocha, Sao Caetano do Sul (BR)

(73) Assignee: Spraying Systems Co., Wheaton, IL (US)

(*) Notice: Subject to any disclaimer, the term of this patent is extended or adjusted under 35 U.S.C. 154(b) by 172 days.

(21) Appl. No.: 17/425,573

(22) PCT Filed: Jan. 24, 2020

(86) PCT No.: PCT/US2020/015041

§ 371 (c)(1),
(2) Date: Jul. 23, 2021

(87) PCT Pub. No.: WO2020/154655

PCT Pub. Date: Jul. 30, 2020

(65) Prior Publication Data

US 2022/0088627 A1 Mar. 24, 2022

Related U.S. Application Data

(60) Provisional application No. 62/796,816, filed on Jan. 25, 2019.

(51) Int. Cl.
*B05B 5/053* (2006.01)
*B05B 1/04* (2006.01)
*B05B 5/043* (2006.01)

(52) U.S. Cl.
CPC .............. *B05B 5/0536* (2013.01); *B05B 1/04* (2013.01); *B05B 5/043* (2013.01)

(58) Field of Classification Search
CPC ..... B05B 5/043; B05B 5/0533; B05B 5/0536; B05B 1/04
USPC ...................................................... 239/690.1
See application file for complete search history.

(56) References Cited

U.S. PATENT DOCUMENTS 4,852,810 A * 8/1989 Behr .................... B05B 5/0533 239/104
4,989,793 A * 2/1991 Gimple ................ B05B 5/0533 239/707
5,584,931 A * 12/1996 Buhlmann ........... B05B 5/0535 118/628
2004/0195403 A1* 10/2004 Atterbury ............ A61M 15/02 239/690

(Continued)

FOREIGN PATENT DOCUMENTS

WO WO-2017063065 A1 * 4/2017 ............... B05B 5/00

*Primary Examiner* — Cody J Lieuwen
(74) *Attorney, Agent, or Firm* — Leydig, Voit & Mayer, Ltd.

(57) ABSTRACT

An induction device for electrification of droplets of hydraulic nozzles comprises: an electrode comprising one or more attachment legs; and an induction electrode holder configured to receive the electrode, wherein the one or more attachment legs are fixed within tubular structures of the induction electrode holder, and wherein a finite distance is formed between an outer surface of each attachment leg in the one or more attachment legs and an inner surface of each tube of the tubular structures.

14 Claims, 4 Drawing Sheets

(56) References Cited

U.S. PATENT DOCUMENTS

2016/0271631 A1* 9/2016 Chevron ............... B05B 5/0407
2019/0176172 A1* 6/2019 Tsuji ......................... B03C 3/00

* cited by examiner

INDUCTION DEVICE FOR ELECTROSTATIC SPRAY NOZZLE ASSEMBLY

CROSS-REFERENCE TO RELATED APPLICATIONS

This patent application claims the benefit of the U.S. Provisional Patent Application No. 62/796,816, filed Jan. 25, 2019, and PCT International Patent Application No. PCT/US2020/015041, filed Jan. 24, 2020, which are incorporated by reference.

FIELD

The disclosure relates to a device for electrifying droplets produced by hydraulic spray nozzles.

BACKGROUND

Hydraulic spray nozzles are commonly used in agricultural applications to discharge chemicals such as pesticides. Such nozzles are configured to produce high speed liquid jets in thin blade shapes in which the discharging liquid bursts into droplets as it reaches the atmosphere. The droplets maintain some velocity after formation, but rapidly decelerate while moving downward with the velocity of the droplets decreasing in relation to their masses. With some smaller droplets, wind can change their downward trajectory and in some cases accelerated evaporation causes the droplets not to reach the desired target. Consequently, conventional pesticide application is wasteful with the amount of pesticide actually applied to plants rarely exceeding 50% of the total discharged pesticide volume.

In agricultural applications, the use of electrically charged droplets can increase the target deposition rate since when a cloud of charged droplets approaches a plant, an induction phenomenon occurs and the surface of the target plant acquires signal charges opposite to that of the droplets. Consequently, the target strongly attracts the drops, leading to improved deposition of the droplets. Moreover, if the electrified drop assumes a curvilinear movement, the drop can be deposited on the backside of the target plant and not just on the frontside exposed to the nozzle. The mutual repulsion between droplets that have the same polarity also contributes to improved distribution of the liquid (e.g., pesticide) on the plants. In this regard, there is an inverse relationship between electrostatic attraction and droplet size, and the inverse relationship is intensified for droplets with diameters less than 100 micrometers. For agrochemical application, the use of electrostatics can reduce the required amount of active ingredients without reducing their biological efficacies. In addition to improving pest and disease control efficiency, electrostatic spraying reduces side effects of pesticides on organisms living in the soil.

One method of producing electrically charged droplets is through the use of a spray nozzle having an induction system with indirect electrification. With such an arrangement, the produced droplets acquire a charge with the opposite polarity from the induction electrode. However, this has the disadvantage that the droplets are re-attracted to the induction electrode causing it to become wet even in the support that holds it. Wetting of the induction electrode and the electrode holder negatively affects the electrification of the droplets and can result in a short circuit between the electrified electrode and the body of the spray nozzle, which usually remains grounded. When electrical leakage occurs due to the presence of this short circuit, the induction voltage begins to decrease causing an increase in the consumption of electric current. One solution to the electrode wetting problem is positioning the nozzles in an environment with constant airflow. However, this is not possible in many applications since the airflow can lead to the discharged droplets drifting away from their intended target. Alternatively, the induction electrode can be protected with sophisticated devices to prevent the accumulation of liquid on its surface. Such devices, however, are very costly and are incompatible with many nozzle designs.

SUMMARY

An embodiment of the disclosure provides an induction device for electrification of droplets of hydraulic nozzles comprising: an electrode comprising one or more attachment legs; and an induction electrode holder configured to receive the electrode, wherein the one or more attachment legs are fixed within tubular structures of the induction electrode holder, and wherein a finite distance is formed between an outer surface of each attachment leg in the one or more attachment legs and an inner surface of each tube of the tubular structures.

An embodiment of the disclosure provides a hydraulic spray nozzle assembly comprising: a spray nozzle configured to spray liquid as a thin sheet, the thin sheet further breaking into liquid droplets; an electrode comprising one or more attachment legs, the electrode configured to induce charge in the liquid droplets; and an induction electrode holder comprising tubular structures, the induction electrode holder configured to receive the electrode, wherein the one or more attachment legs are fixed within the tubular structures, and wherein a finite distance is formed between an outer surface of each attachment leg in the one or more attachment legs and an inner surface of each tube of the tubular structures.

DETAILED DESCRIPTION

Figure 1:
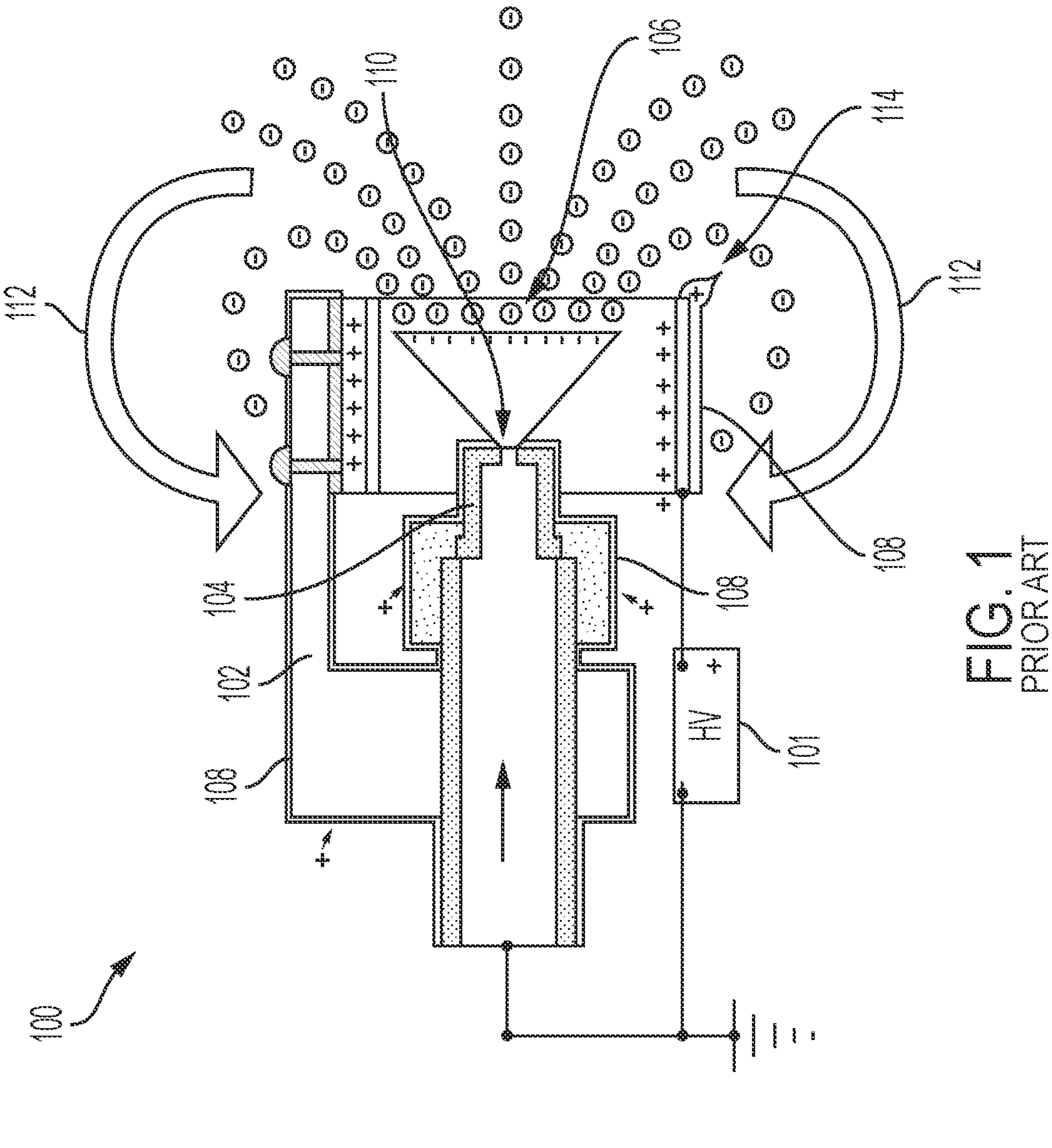
FIG. 1 is a schematic side sectional view of a conventional prior art electrostatic spray nozzle showing formation of a continuous liquid film on an electrode holder.

FIG. 1 illustrates a conventional induction droplet electrification system 100 in the prior art. In FIG. 1, an electrode 106 is connected to a voltage source 101 and is secured to a head 102 made of insulating material. The electrode 106 is positioned concentrically in a drop-forming zone produced by a spray nozzle 104. The droplets formed have an electrically polar charge opposite the charge on the electrode 106. Electrically opposite charges attract so droplets after exiting the spray nozzle and gaining an induced charge opposite to that of the electrode 106 become attracted to parts of the system 100. The droplets follow a re-attraction curvilinear movement 112 causing parts of the system 100, e.g., the head 102, the spray nozzle 104, and the electrode 106, to get wet. As the system 100 becomes wet from the curvilinear movement 112, a liquid conductive film 108 begins to form on the surface of parts of the system 100. As the liquid conductive film 108 accumulates, over time, a short circuit point 110 can develop between the high voltage applied to the electrode 106 and the tip of the spray nozzle 104 that remains at a ground potential. The short circuit point 110 can disturb or reduce efficiency of the electrification of the drops. In addition, the liquid sheet from the spray nozzle 104 in contact with the electrode 106 can produce pointed crests 114 that can cause reverse ionization by partially discharging induction-induced droplets. With the induction system of FIG. 1, the electrodes 106 and/or the head 102 can accumulate large amounts of liquid and normally require periodic stopping of the spraying operation to dry the spray nozzle 104.

Figure 2:
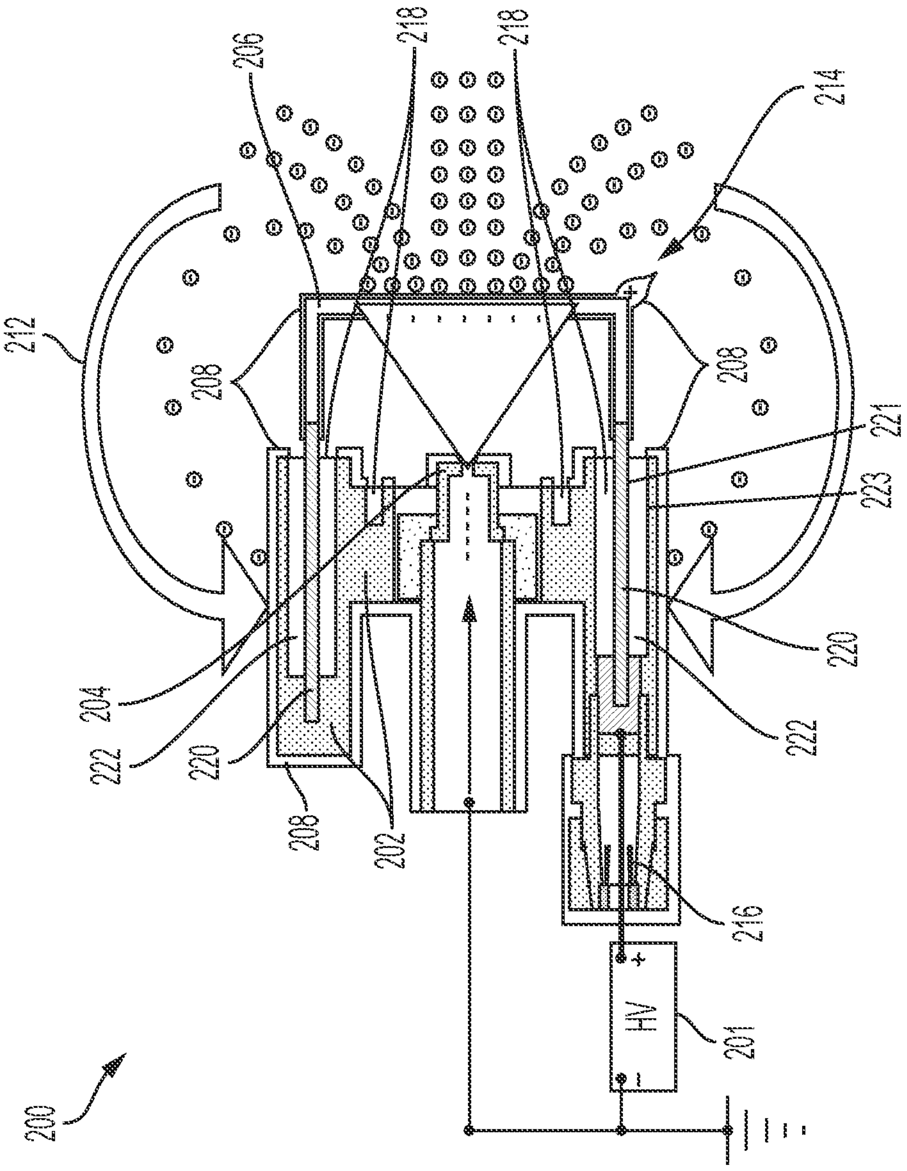
FIG. 2 is a schematic side sectional view of an electrostatic spray nozzle assembly having an induction device according to an embodiment of the disclosure.

According to one aspect of the present disclosure, an induction device for an electrostatic hydraulic nozzle is provided that includes an induction electrode holder made of insulating material and an electrode having two fixing rods attached to the base of two deep holes, with diameters larger than the electrode's rods. With this configuration, a gap of a finite distance between the electrode and the inner wall of the support hole is created that produces an air mattress for insulation of the electrode attachment supports. FIG. 2 illustrates a spray nozzle system 200 according to an embodiment of the disclosure. The system 200 includes a spray nozzle 204 and an induction device including a voltage supply 201, an induction electrode 206 and an induction electrode holder 202. Two or more legs 220 of the induction electrode 206 are secured to tubular interior cavities 222 in the induction electrode holder 202, in a manner where voids or gaps 218 are formed. The gap 218 in each case is defined by a finite distance between an outer surface 221 of the leg 220 and the inner wall 223 of the cavity 222. One of the legs 220 connects to a high voltage wire through a high voltage cable connector 216 which is located at the backside of a cavity 222, to form an air gap for insulating the electrode 206. Although FIG. 2 illustrates two legs 220, one continuous leg can be used instead of two.

The induction electrode holder, e.g., induction electrode holder 202, can be attached to the spray nozzle via any attachment means, e.g., a spray tip attachment nut. The use of the induction electrode holder 202 can facilitate conversion of existing hydraulic spray nozzles into electrostatic spray nozzles. In some embodiments, spray nozzles have filters inside so if the inducer can be removed, it allows for cleaning of filter. Thus, separating the holder and the nozzle attachment makes it easier to clean and replace filters. When the induction electrode holder engages the spray tip attachment nut, the induction electrode 206 automatically positions itself in the droplet-forming region and may undergo refined positioning adjustments.

During operation of the spray nozzle system 200, the induction electrode 206 is electrified. The electrified induction electrode 206 promotes re-attraction of part of the charged droplets which wet the electrode holder 202 forming a liquid film 208 and liquid reverse ionization ridges 214. The voids between the legs of the induction electrode 206 and other cavities or gaps 218 on the surface of the electrode holder 202 prevent the liquid film 208 from being continuous, thereby eliminating a risk of short circuit between the grounded spray nozzle 204 and the induction electrode 206, which is subjected to a high voltage by the voltage supply 201. Compared to FIG. 1, the gaps 218 disrupt continuity of the liquid film 208 formed during operation of the spray nozzle 204. This prevents the liquid film 208 from interconnecting the tip of the grounded spray nozzle 204 to the high voltage metal electrode, thereby preventing a short circuit between the induction electrode 206 and the spray nozzle 204.

According to another aspect of the disclosure, the shape of the induction electrode 206 may be configured according to the discharge pattern of the spray nozzle 204, with for example an annular format for cone shaped patterns and parallel rods for flat shaped patterns. Spray nozzles can be classified in two categories—cone jet spray nozzles or flat spray nozzles—according to geometry of their spray pattern. Conical spray nozzles and flat spray nozzles are both suitable for induction electrification because they include devices or structures that force the liquid to emerge through the nozzle discharge orifice as a thin sheet, which then breaks into drops upon striking air at a small distance from the orifice. This thin liquid sheet is beneficial in the induction process, since it allows displacement of electric charges, when an electrostatic field, coming from an electrified electrode, is disposed near the area of droplet formation.

Figure 3C:
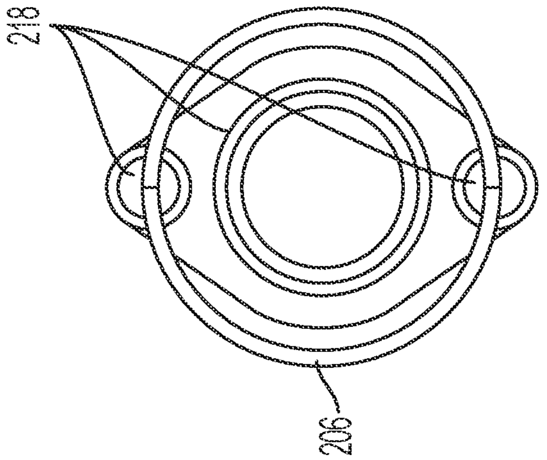
FIG. 3C is an end view of the induction electrode holder and the induction electrode of FIG. 3A.
Figure 3A:
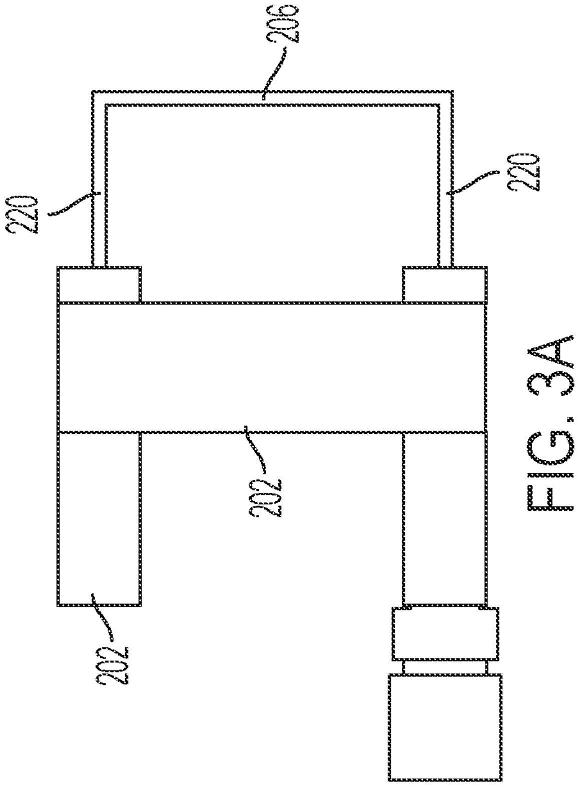
FIG. 3A is a side view of the induction electrode holder and induction electrode of the embodiment of FIG. 2.
Figure 3B:
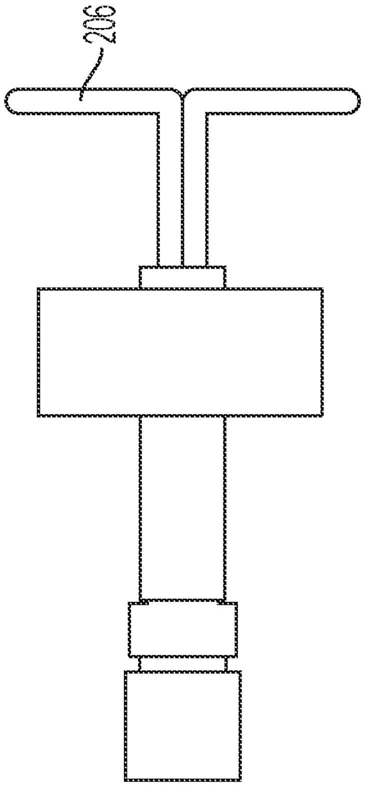
FIG. 3B is a top view of the induction electrode holder and the induction electrode of FIG. 3A.

For cone jet spray nozzles, the induction electrode 206 can have an annular structure 224 attached to two rods or legs 220. FIGS. 3A, 3B and 3C provide side, top, and end views, respectively, of the induction electrode holder 202 and the induction electrode 206 of the embodiment of FIG. 2, which includes an electrode 206 particularly configured for conical spray nozzles. The induction electrode 206 may be constructed of conductive material, preferably non-oxidizable, with a cylindrical cross-section having a diameter of less than 4.5 mm in order to avoid accumulation of liquid. For example, the induction electrode 206 can be a stainless steel wire with thickness ranging between 1.2 mm and 4.5 mm. Depending on quality of the spray tip and pressure variations which exist between different types of sprayers, the pattern of droplets produced by a conical spray nozzle may be between 10 millimeters and 25 millimeters in diameter. According to one example, in order for the induction to be adequate in a hollow cone nozzle, the distance from the electrode to the liquid sheet breakup zone should be equivalent to 1.0 mm for each kV applied and thus the ring-shaped electrode may have a diameter between 15 mm and 70 mm. Therefore, according to such an example, the induction voltage can vary from 0.1 kV to 20 kV. This variation of electrode diameters and induction voltages can enable use in sprayers with airflow, which can reduce the diameter of the base of the cone where the liquid breaks into drops.

Figure 4C:
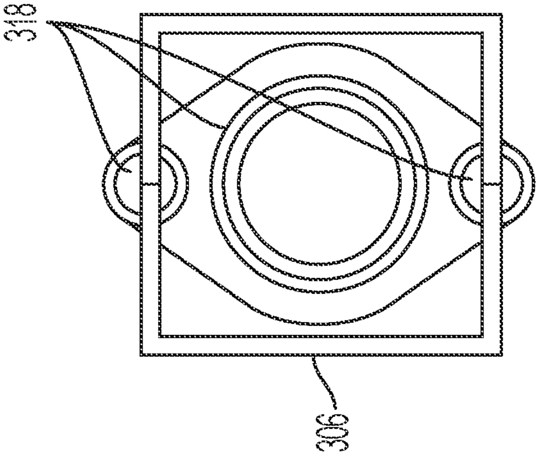
FIG. 4C is an end view of the induction electrode holder and the induction electrode of FIG. 4A.
Figure 4A:
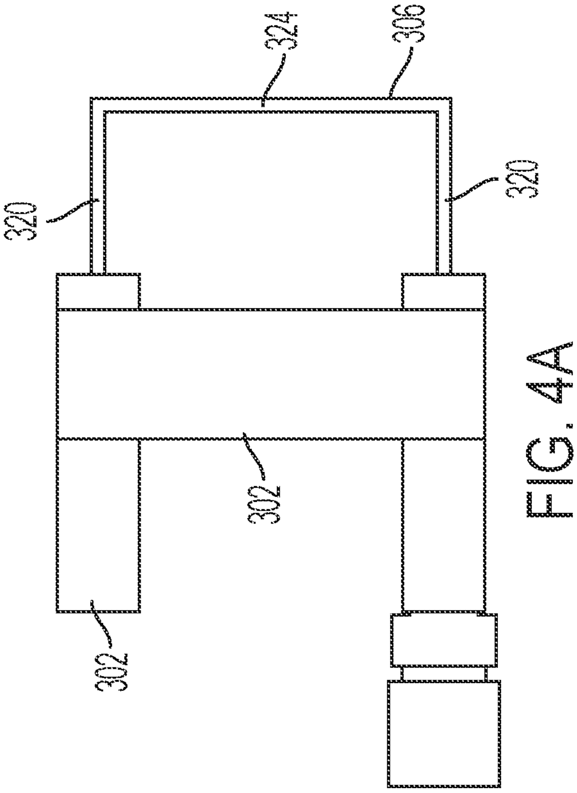
FIG. 4A is a side view of an alternative embodiment of an induction electrode holder and an induction electrode according to the disclosure.
Figure 4B:
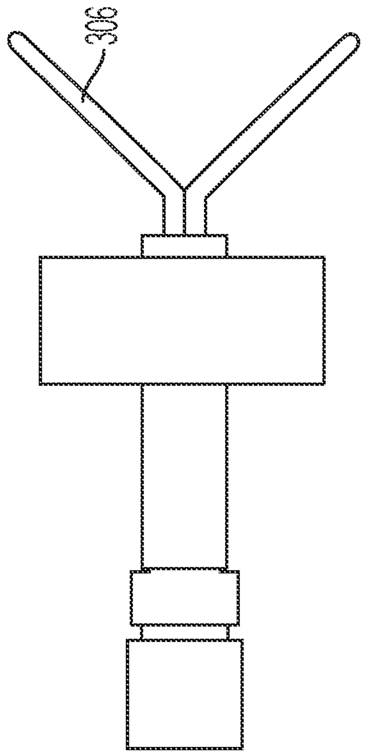
FIG. 4B is a top view of the induction electrode holder and the induction electrode of FIG. 4A.

For flat jet nozzles, the induction electrode may consist of two parallel stainless-steel wire rods, as shown e.g., in FIG. 4C, such that the jet is positioned in the middle between the rods, so as to maximize the electrostatic field in the zone of droplet formation. FIGS. 4A, 4B and 4C provide side, top, and end views, respectively, of an embodiment of an induction electrode holder 302 with an induction electrode 306 which is particularly configured for fan jet nozzles. As with the embodiment of FIG. 3C, the induction electrode 306 can be a stainless steel wire with thickness ranging between 1.2 mm and 4.5 mm. Flat spray nozzles can simplify the construction of the induction electrode, because two simple electrically conducting rods, positioned parallel and laterally to the plane of the jet, allow the induction of electric charges. Many drops can escape laterally to the plane of the spray pattern, thus, the drops assume an ogival distribution. Therefore, the rods can be kept at distances sufficient to avoid wetting. According to some embodiments, the distances between the rods can vary between 15 mm and 70 mm.

During a spray operation, some liquid globules that have accumulated on the surface of the induction electrodes 206, 306 can be pushed off the surface. As discussed above, these globules taper to form pointed or crested regions that can cause reverse ionization (e.g., liquid reverse ionization ridges 214 shown in FIG. 2), reducing efficiency of the induction device. The larger the surface of the induction electrode 206, 306, the greater the number of reverse ionization points or reverse ionization ridges 214. Since the electrodes 206, 306 of the disclosed induction device can be made of relatively thinner wires, the liquid buildup on its surface is smaller, and the formation of pointed, liquid ridges which exert reverse ionization is reduced.

During hydraulic spraying, the droplet size spectrum is varied and micro droplets can be formed which contribute to a humidity saturation in the space between the electrode 206, 306 and the induced liquid sheet. This humidity increases the conductivity of the air and consequently reduces the electric current intensity in the pattern of droplets, which will not exceed 3 mA per mL of spray liquid per second (3.0 mC/kg). In the case of agriculture, plants, especially those with high leaf density, form an equipotential surface similar to a Faraday cage, which prevents penetration of electrified droplets inside the canopy. Thus, drops with a low charge intensity are more likely to penetrate into the canopy of the plants, presenting increased attraction only when they are very close to structures such as branches and leaves.

Embodiments of the disclosure provide constructive solutions for converting hydraulic cone or flat jet spray nozzles into electrostatic hydraulic nozzles. The spray tips can have standardized diameters that are around 12.5 mm, but the length of the nozzle body can vary greatly. The layers of the induction electrode holder 202, 302 can allow for manual adjustment for positioning the induction electrode 206, 306 in the liquid sheet breakup zone. In an embodiment, the induction electrode 206, 306 is manually positioned to ensure that it does not get wet prior to start of electrification. In addition to agricultural applications, the induction device of the present disclosure can be used in industrial for the application of electricity conducting liquids, e.g., grout.

An induction device for electrification of droplets of hydraulic nozzles according to embodiments of the disclosure provides several advantages. For example, the device reduces production costs and can be adapted to any type of sprayer that uses a hydraulic nozzle, whether in an industrial or agricultural setting. The induction device also allows the use of working voltages of less than 10,000 V with very low amperage. The induction device also allows wetting of the induction electrode without significantly affecting the electrification of the droplets. Additionally, the device reduces droplet discharge by reverse ionization and reduces dripping loss due to the small area of attraction of the induction electrode holder. Other advantages include an increase in fluid droplet deposition during spray operations which can result in a reduction in spray volume applied and an increase in machine operating efficiency. The air gaps in the induction device inhibit formation of a short-circuit between the induction electrode holder and the grounding system or spray nozzle. Moreover, the device produces continuous electrification of droplets, even with the induction electrode support completely wet. The device also reduces electrical current consumption resulting in a reduction in consumption of the batteries used to power the high voltage source, which thereby increases the spray period without the need for battery recharging. The device also can reduced risk of exposure of operators to electrical discharge.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An induction device for electrification of droplets of a hydraulic nozzle, the nozzle discharging the droplets in a spray pattern, the induction device comprising:

an electrode comprising one or more attachment legs and a transverse portion electrically exposed to the discharging droplets of the spray pattern, the transverse portion extending transversely relative to the one or more attachment legs and extending in a plane coplanar with a cross-sectional plane of the spray pattern; and an induction electrode holder configured to receive the electrode, wherein the one or more attachment legs each have a first leg end that is fixed within corresponding one or more tubular orifices of the induction electrode holder, each tubular orifice being open at a first end with the corresponding attachment leg extending in a longitudinal direction from the first leg end through the open first end with an open space defined by the open first end of the tubular orifice surrounding the respective attachment leg where the attachment leg exits the first end of the tubular orifice, and wherein a finite distance is formed between an outer surface of each attachment leg in the one or more attachment legs and an inner surface of each of the tubular orifices in which the one or more attachment legs are fixed, the finite distance defining a gap between the outer surface of each attachment leg and the inner surface of the corresponding tubular orifice at the open first end of the corresponding tubular orifice;

wherein the finite distance and the gap are large enough to prevent a formation of continuous liquid film;

wherein the one or more attachment legs each have a respective terminal second leg end that is spaced further in the longitudinal direction from the first leg end than the open first end of the tubular orifice.

2. The device according to claim 1, wherein:

the transverse portion of the electrode has an annular shape.

3. The device according to claim 2, wherein:

a ring diameter of the transverse portion of the electrode varies between 15 mm and 70 mm.

4. The device according to claim 1, wherein:

the transverse portion of the electrode comprises two parallel rods.

5. The device according to claim 4, wherein:

spacing between the rods varies between 15 mm and 70 mm.

6. The device according to claim 1, wherein:

a voltage on the electrode varies between 0.1 kV to 20 kV.

7. The device according to claim 1, wherein the induction electrode holder comprises dielectric material.

8. The device according to claim 1, wherein a cable connector is arranged at a second end opposite the open first end of one of the one or more tubular orifices.

9. A hydraulic spray nozzle assembly comprising:

a spray nozzle configured to spray liquid as a thin sheet in a discharge direction in a spray pattern, the thin sheet further breaking into liquid droplets;

an electrode comprising one or more attachment legs and a transverse portion electrically exposed to the discharging liquid droplets, the transverse portion extending transversely relative to the one or more attachment legs and extending in a plane co-planar with a cross-sectional plane of the spray pattern, the electrode configured to induce charge in the liquid droplets; and an induction electrode holder comprising one or more tubular orifices, the induction electrode holder configured to receive the electrode, wherein the one or more attachment legs each have a first leg end that is fixed within the one or more tubular orifices, each tubular orifice being open at a first end with the corresponding attachment leg extending in a longitudinal direction from the first leg end through the open first end with an open space defined by the open first end of the orifice surrounding the respective attachment leg where the attachment leg exits the first end of the tubular orifice, and wherein a finite distance is formed between an outer surface of each attachment leg in the one or more attachment legs and an inner surface of each of the one or more tubular orifices in which a corresponding attachment leg is received, the finite distance defining a gap between the outer surface of each attachment leg and the inner surface of the corresponding tubular orifice at the open first end of the corresponding tubular orifice;

wherein the finite distance and the gap are large enough to prevent a formation of continuous liquid film on the electrode, the induction electrode holder, or the spray nozzle;

wherein the one or more attachment legs each have a respective terminal second leg end that is spaced further in the longitudinal direction from the first leg end than the open first end of the tubular orifice.

10. The hydraulic spray nozzle assembly according to claim 9, wherein the transverse portion of the electrode has an annular shape.

11. The hydraulic spray nozzle assembly according to claim 10, wherein a diameter of the annular shape varies between 15 mm and 70 mm.

12. The hydraulic spray nozzle assembly according to claim 9, wherein the transverse portion of the electrode comprises two parallel rods.

13. The hydraulic spray nozzle assembly according to claim 12, wherein spacing between the rods varies between 15 mm and 70 mm.

14. The hydraulic spray nozzle assembly according to claim 9, wherein a cable connector is arranged at a second end opposite the open first end of one of the one or more tubular orifices.

* * * * *